United States Patent
Ni et al.

(10) Patent No.: US 9,727,397 B2
(45) Date of Patent: Aug. 8, 2017

(54) CONTAINER-LESS JSP TEMPLATE

(75) Inventors: Bin Ni, Fremont, CA (US); Mark P. Palaima, Saratoga, CA (US); Thierry Neel, Campbell, CA (US); Yitao Yao, Saratoga, CA (US)

(73) Assignee: PAYPAL, INC., San Jose, CA (US)

( * ) Notice: Subject to any disclaimer, the term of this patent is extended or adjusted under 35 U.S.C. 154(b) by 1717 days.

(21) Appl. No.: 12/176,246

(22) Filed: Jul. 18, 2008

(65) Prior Publication Data

US 2009/0031287 A1 Jan. 29, 2009

Related U.S. Application Data

(60) Provisional application No. 60/961,621, filed on Jul. 23, 2007.

(51) Int. Cl.
| | | |
|---|---|---|
| *G06F 9/45* | (2006.01) | |
| *G06F 9/54* | (2006.01) | |
| *G06F 17/30* | (2006.01) | |

(52) U.S. Cl.
CPC ........... *G06F 9/547* (2013.01); *G06F 8/41* (2013.01); *G06F 8/51* (2013.01); *G06F 17/3089* (2013.01)

(58) Field of Classification Search
CPC ..... G06F 8/40; G06F 8/41; G06F 8/51; G06F 9/547; G06F 17/3089; G06F 17/30899
See application file for complete search history.

(56) References Cited

U.S. PATENT DOCUMENTS

| | | | |
|---|---|---|---|
| 6,557,076 B1 * | 4/2003 | Copeland et al. | 711/118 |
| 6,718,515 B1 * | 4/2004 | Conner et al. | 715/207 |
| 6,732,330 B1 * | 5/2004 | Claussen et al. | 715/234 |
| 7,080,092 B2 * | 7/2006 | Upton | |
| 7,080,350 B2 * | 7/2006 | Saimi et al. | 717/100 |
| 7,099,958 B2 * | 8/2006 | Matsutsuka et al. | 709/246 |
| 7,739,699 B2 * | 6/2010 | Andreeva et al. | 719/330 |
| 2001/0034771 A1 * | 10/2001 | Hutsch et al. | 709/217 |
| 2001/0047402 A1 * | 11/2001 | Saimi et al. | 709/219 |
| 2002/0026447 A1 * | 2/2002 | Matsutsuka et al. | 707/103 Y |
| 2002/0104071 A1 * | 8/2002 | Charisius et al. | 717/109 |
| 2002/0120649 A1 * | 8/2002 | Goward | G06F 9/542 |
| | | | 715/234 |
| 2002/0138633 A1 * | 9/2002 | Angwin et al. | 709/229 |
| 2002/0147652 A1 * | 10/2002 | Gheith et al. | 705/26 |
| 2002/0184208 A1 * | 12/2002 | Kato | 707/4 |
| 2003/0014442 A1 * | 1/2003 | Shiigi et al. | 707/513 |

(Continued)

OTHER PUBLICATIONS

Azzurri "JET Tutorial Part 1 (Introduction to JET)" Azzurri Ltd 2004 <http://eclipse.org/articles/Article-JET/jet_tutorial1.html> pp. 1-5.*

(Continued)

*Primary Examiner* — Geoffrey St Leger
(74) *Attorney, Agent, or Firm* — Maschoff Brennan

(57) ABSTRACT

A container-less JSP system is provided. An example container-less JSP system comprises a detector, a trigger module, and an invoker. The detector may be configured to detect a request initiated by a client application to invoke a JSP template. The request is a protocol-neutral Java™ interface. The trigger module may be configured to trigger the protocol-neutral Java™ interface to invoke the JSP template. The invoker may be configured to invoke the JSP template.

17 Claims, 5 Drawing Sheets

(56) References Cited

U.S. PATENT DOCUMENTS

| | | | |
|---|---|---|---|
| 2003/0050932 A1* | 3/2003 | Pace et al. | 707/100 |
| 2003/0105884 A1* | 6/2003 | Upton | 709/318 |
| 2003/0110315 A1* | 6/2003 | Upton | 709/328 |
| 2003/0135509 A1* | 7/2003 | Davis et al. | 707/100 |
| 2003/0140115 A1* | 7/2003 | Mehra | G06F 9/547 709/217 |
| 2003/0217195 A1* | 11/2003 | Mandal | G06F 9/547 719/330 |
| 2003/0217331 A1* | 11/2003 | McKellar et al. | 715/511 |
| 2004/0143823 A1* | 7/2004 | Wei | G06F 8/41 717/140 |
| 2004/0148318 A1* | 7/2004 | Taylor et al. | 707/203 |
| 2004/0148565 A1* | 7/2004 | Davis et al. | 715/501.1 |
| 2004/0168124 A1* | 8/2004 | Beisiegel et al. | 715/513 |
| 2004/0260806 A1* | 12/2004 | Martin et al. | 709/224 |
| 2005/0243604 A1* | 11/2005 | Harken | G06F 8/51 365/185.22 |
| 2005/0262042 A1* | 11/2005 | Kondo | 707/1 |
| 2006/0015839 A1* | 1/2006 | Owens et al. | 717/100 |
| 2006/0031750 A1* | 2/2006 | Waldorf et al. | 715/501.1 |
| 2006/0075385 A1* | 4/2006 | Backhouse | G06F 8/41 717/115 |
| 2006/0173815 A1* | 8/2006 | Vedula | 707/3 |
| 2006/0277248 A1* | 12/2006 | Baxter | G06F 17/3089 709/201 |
| 2011/0213829 A1* | 9/2011 | Concini | G06F 9/547 709/203 |

OTHER PUBLICATIONS

Stephen Gilmore "Enterprise Computing: Java Server Pages" Sams Publishing , 2005 , <http://www.inf.ed.ac.uk/teaching/courses/ec/slides/jsp.pdf> pp. 1-113.*

Douglas D., et al., Introducing eBay's Scalable Innovation Platform, JavaOne Conference, 2008, 51 pages, [retrieved on Dec. 12, 2016], Retrieved from the Internet: <URL:http://www.oracle.com/technetwork/server-storage/ts-7550-159323.pdf>.*

Cruz, J. et al., JavaServer pages, 2002, 14 pages, [retrieved on Apr. 6, 2017], Retrieved from the Internet: <URL:https://webdocs.cs.ualberta.ca/~zaiane/courses/cmput499/work/presentations/02/>.*

* cited by examiner

CONTAINER-LESS JSP TEMPLATE

RELATED APPLICATIONS

This application is related to and hereby claims the priority benefit of U.S. Provisional Patent Application No. 60/961,621 filed Jul. 23, 2007 and entitled "CONTAINER-LESS JSP TEMPLATE", which application is incorporated herein by reference in its entirety.

TECHNICAL FIELD

This application relates to a container-less JSP template.

BACKGROUND

Java™Server Pages (JSP) is a Java™ technology that has a purpose of controlling the content or appearance of a web page by allowing developers to embed Java™ code and certain pre-defined actions into static or parameterised content or a content template. Parameterised content (or a content template) typically includes a static portion (text) and one or more placeholders that can be replaced by the web application with appropriate data. When a web application receives a request for a web page from a browser application, the web application accesses the content template, replaces all placeholders with appropriate values, and provides the resulting web page to the browser.

JSP can be used to dynamically generate HyperText Markup Language (HTML), Extensible Markup Language (XML) or other types of documents in response to a web client request. JSPs are compiled into Java™ servlets. A servlet is a small program that can be specified in the Web page. A servlet is run on a web server to modify a web page before it before it is sent over Hypertext Transfer Protocol (HTTP) to the requesting client. In order to process JSP pages, a web server needs a JSP container—the Java™ 2 Platform, Enterprise Edition (J2EE) container. The JSP container intercepts clients' requests for JSP pages, translates the intercepted JSP page into a servlet, where the JSP elements are converted into Java™ code. The container then compiles the servlet class that can be executed. The output of the execution may be an HTML file that can be provided to the requesting client. The container has to run inside a server.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

Figure 1:
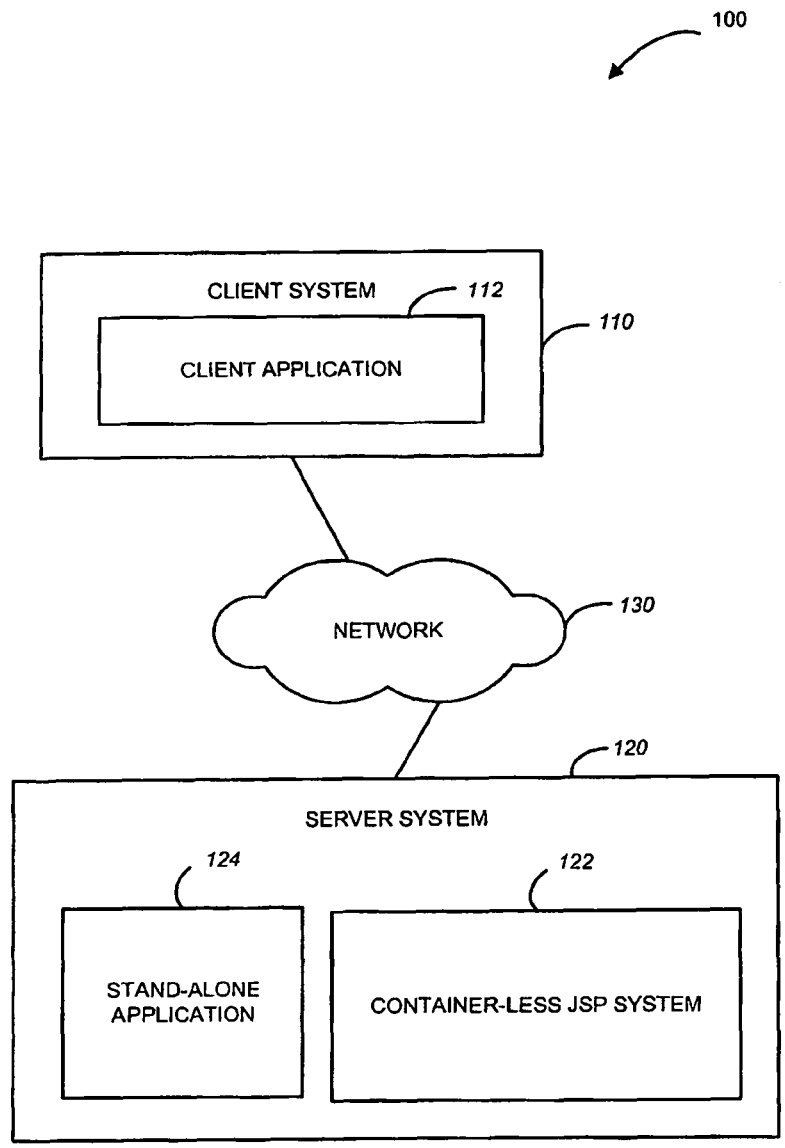
FIG. 1 is a diagrammatic representation of a network environment within which an example system that supports container-less JSP may be implemented.

JSP technology is the templating solution from J2EE. It has various features for templating, as well as seamless integration with Java™. Existing JSP technology it tightly coupled with servlet technology, as explained above. For example, existing JSP technology requires that a JSP template is invoked from inside a J2EE container. All definitions are required to follow J2EE container standard. Furthermore, there is no Java™ application programming interface (API) API currently available that can execute JSP.

A container-less JSP template may be provided, in one example embodiment, implemented in the form of so called EFS—eBay® Server Fragments. EBay® is a registered trademark of eBay Inc. In the following description, for purposes of explanation, numerous specific details are set forth in order to provide a thorough understanding of an embodiment of the present invention. It will be evident, however, to one skilled in the art that the present invention may be practiced without these specific details.

ESF—eBay® Server Fragments—is a platform that allows the use of JSP technology together with a templating mechanism without relying on J2EE Servlets. This approach contributes to solving a problem of JSPs being dependent on a specific protocol (HTTP) and a specific overarching framework (J2EE). The "E" in ESF stands for eBay®. The "S" is ESF is for Server. ESF is a server-side templating mechanism that allows JSPs to be invoked by stand-alone applications. The "F" in ESF is for Fragment. A fragment may be thought of as a template-centric page. In ESF, there is no requirement for XML declarations. JSP TagLibs and TagHandlers "XML" declarations, were converted into Java™ Type Classes and use Java™ 5.0 Annotations instead. This approach contributes to reducing or elimination the need for XML as a way to describe/define the templating abstractions and processing. ESF, in one example embodiment, still supports the standard JSP XML declarations in order to allow for interoperability and quick reuse and prototyping.

In one embodiment, ESF broadly supports all major JSP abstractions, such as, e.g., the abstractions listed below.
Declarations
Expressions
Scriptlets
EL (Expression Language)
User Defined Functions
Directives—Attribute, Include, Page, Tag, TagLib
All of the <jsp:xxx> tags—XML syntax
Taglib Support (including Standard Taglibs—JSTL 1.1)
Comments
Scoped variables
Access to Servlet/JSP types via ESF wrappers if needed
Adapter support to existing Servlet Runtime constructs if needed While JSP standard describes a set of objects/functions that are HTTP and J2EE centric, ESF provides default implementations of these types and makes them available to ESF developers. Adapters are provided so that actual J2EE web request/response instances can be accessed with ESF.

An example container-less JSP template solution, ESF, in one example embodiment, makes it possible to leverage the templating feature of JSP in various types of applications in addition to a web application. For example, ESF permits using the templating feature of JSP in standalone Java™ Applications that are not web-based, e.g., a batch application. ESF also permits using the templating feature of JSP in component based applications, where the application presentation is constructed from components in a framework.

FIG. 1 is a diagrammatic representation of a network environment 100 within which an example system that supports container-less JSP may be implemented. As shown in FIG. 1, the network environment 100 may include a client system 110 and a server system 120. The server system 120, in one example embodiment, may host a network-based transaction facility. The client system 110 may run a client application 112 and may have access to the server system 120 via a communications network 130. The communications network 130 may be a public network (e.g., the Internet, a wireless network, etc.) or a private network (e.g., a local area network (LAN), a wide area network (WAN), Intranet, etc.).

The server system 120 may host a container-less JSP system 122. The container-less JSP system 122 may be used by the client application 112, as well as by a stand-alone application 124 to invoke JSP files without the need for the J2EE container. An example container-less JSP system may be discussed with reference to FIG. 2.

Figure 2:
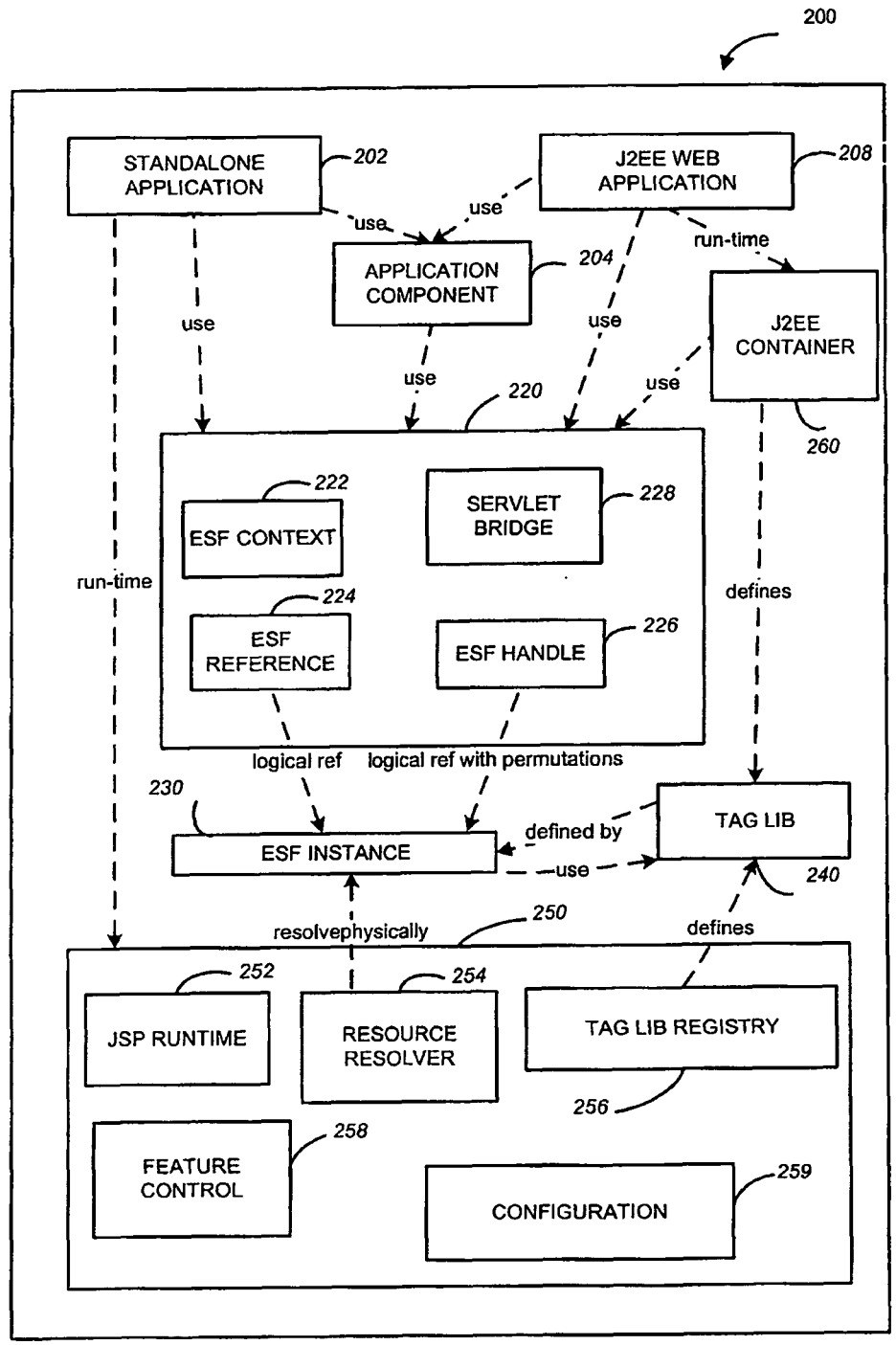
FIG. 2 is block diagram of an architecture of a system that supports container-less JSP, in accordance with one example embodiment.

FIG. 2 shows an example architecture 200 of a system that supports container-less JSP. As shown in FIG. 2, various application, such as a stand-alone application 202, an application component 204, and a web application 208 use an ESF programming model 220. The ESF programming model 220, together with runtime 250 implement the container-less JSP approach. The ESF programming model 220 comprises an ESF reference 222, an ESF handle 224, an ESF handle 226, and a servlet bridge 228. The ESF reference 222 provides a logical reference to an ESF instance 230, while the ESF handle 224 provides a logical reference with permutations to the ESF instance 230.

The runtime 250 comprises JSP runtime 252, a resource resolver 254, a Tag Lib registry 256, a feature control component 258, and configuration component 259. The resource resolver 254 resolves logical references in the ESF instance 230 into physical resources. A Tag Lib 240 is defined by the Tag Lib registry 256 of the runtime 250, as well as by the ESF instance 230, and by a J2EE container 260 that may also be present in the architecture 200.

As shown in FIG. 2, the JSP templating part (the ESF programming model 220 and the runtime 250) is separated out of the J2EE servlet container 260. As a pure Java™ platform: ESF runtime 250 may be used to perform the functions listed below.

Execute the JSP

Resolve the JSP resources: JSP files, TLDs, Tag Files and etc.

Handle permutations

Turn on/off the JSP features, e.g Sriptlet, EL

Register Tag Libraries

Support Customization and Configuration

The ESF programming model 220 may be provided as a Java™ API. The standalone application 202 and the application component 204 may reference and execute JSP through the API (the ESF programming model) without relying on the servlet technology. The servlet bridge 228 may be provided to bridge the J2EE container 260 to ESF. This approach may make ESF compatible with classic JSP architecture.

In FIG. 2, the blocks representing the ESF context 222, the ESF reference 224, the ESF handle 226, the JSP runtime 252, and the Tag Lib Registry 256 may be included in a generic platform. The blocks representing the servlet bridge 228, the resource resolver 254, the feature control 258, and the configuration 259 may be included in a customizable platform. The block representing the ESF instance 230 may be included in the ESF source.

Figure 3:
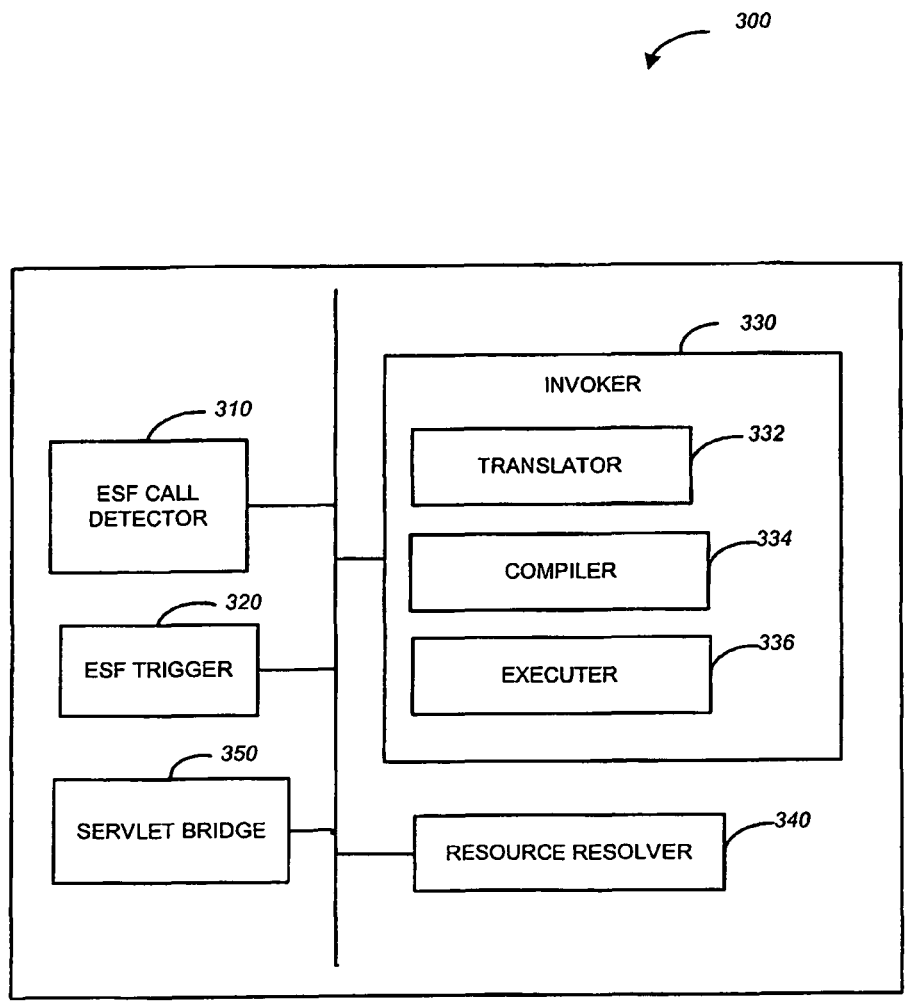
FIG. 3 is a block diagram of a container-less JSP system, in accordance with an example embodiment.

FIG. 3 is a block diagram of a container-less JSP system 300, in accordance with an example embodiment. The system 300 comprises an ESF call detector 310, an ESF trigger 320, an invoker 330, a resource resolver 340, and a servlet bridge 350. The ESF call detector 310 may be configured to detect an ESF API called by a client application to invoke a JSP template. The ESF trigger 320 may be configured to trigger the ESF API (which is a protocol-neutral Java™ interface). The invoker 330 includes a translator 332 to translate the JSP template into a Java™ file, a compiler 334 to compile the Java™ file into an executable class, and an executor 336 to execute the generated class. The resource resolver 340, and the servlet bridge 350 may correspond, respectively, to the resource resolver 254, and the servlet bridge 228 of FIG. 2. Example operation performed by the system 300 may be discussed with reference to FIG. 4.

Figure 4:
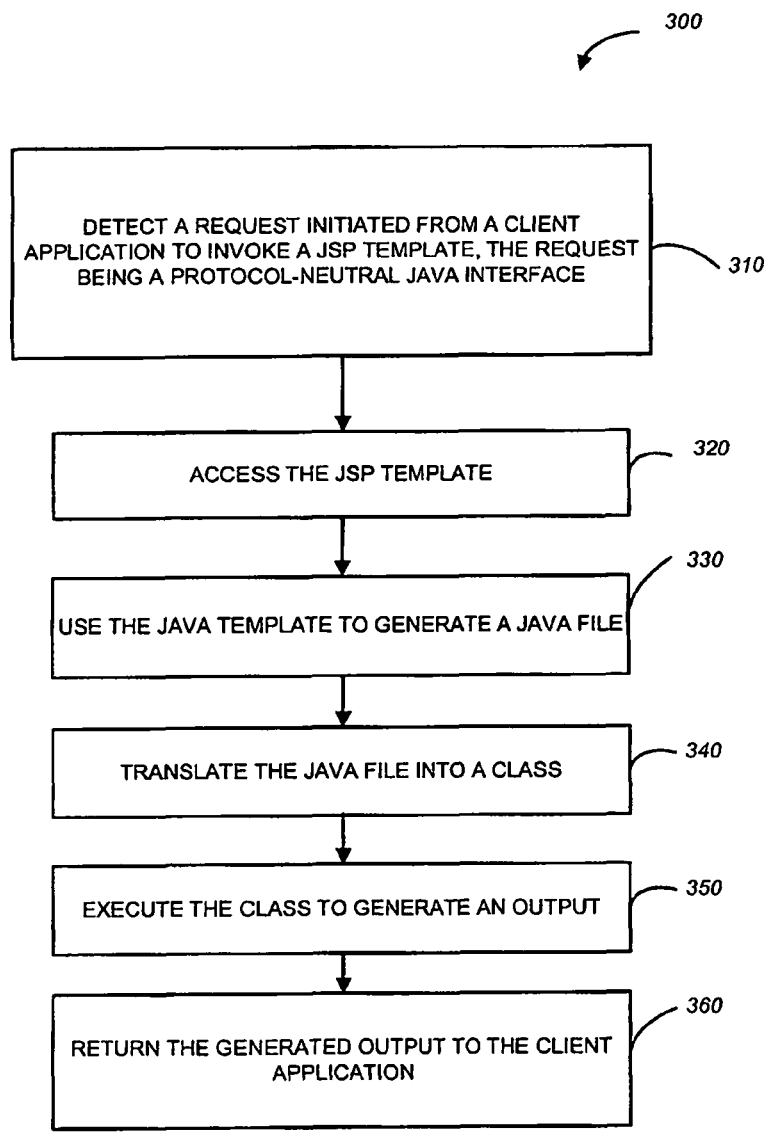
FIG. 4 is a flow chart of a method to invoke a JSP template, in accordance with an example embodiment.

FIG. 4 is a flow chart of a method 400 to invoke a JSP template, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 120 of FIG. 1 and, specifically, at the system 300 shown in FIG. 3.

As shown in FIG. 4, the method 400 commences at operation 410, where the ESF call detector 310 of FIG. 3 detects a request initiated by a client application to invoke a JSP template. The request, in this context, refers to a protocol-neutral Java™ interface, which in one embodiment is an ESF API. At operation 320, the ESF trigger 320 of FIG. 3 triggers the protocol-neutral Java™ interface to invoke the JSP template. The invoking of the protocol-neutral Java™ interface causes the execute method of the ESF API to be performed, which translates the template into Java™, compiles the translated Java™ into a class, sets up a default context for the class to execute in, executes the service entry method in the class, and returns the generated output.

Returning to FIG. 4, at operation 330, the JSP template is accessed using the resource resolver 340 of FIG. 3. At operation 340, the translator 332 of FIG. 3 translated the JSP template into a Java™ file. At operation 350, the compiler 334 of FIG. 3 compiles the Java™ file into an executable class. At operation 360, the executor 336 of FIG. 3 executes the generated class to generate an output. The output is provided to the client application at operation 370.

It will be noted that all HTTP and servlet constructs may still be available to an ESF template. ESF, in one example embodiment, has implementations for the core J2EE servlet and JSP types.

Thus, an example solution described herein provides a JSP-based system functionality that can support any Java™ application using JSP templating technology. In one example embodiment, ESF may facilitate a mixed software engineering approach between template-based application construction and component-based application construction, which may be utilized beneficially for both the UI with most of the part being statically defined and the UI with most of the part being dynamically constructed, and the seamless transitions between the two. ESF may be used by any application that employs JSP out of the J2EE container.

An example of a JSP program executing from a Java™ main is shown below.

```
EsfTemplate esf = new EsfTemplate(
    "Date is: <%=(new Java ™.util.Date( )).toString( )%>") ;
System.out.println(esf.execute( )) ;
```

Shown below is an ESF example of a regular JSP page being defined and processed by ESF.

```
<html>
    <head>
        <title>V4's JSP in a Java ™ main</title>
    <head>
    <body>
        The date is: <%=(new Java ™.util.Date( )).toString( )%>
    </body>
</html>
```

An example Java™ program provided below is showing a simple class that extends a general example base class V4DeCodeBase. V4DeCodeBase provides a set of convenience routines such as being able to get the contents of a file as a String ala getResourceAsString( . . . ).

```
package demo ;
import v4.V4DeCodeBase ;
import com.eBay ®.esf.EsfTemplate ;
public class V4Demo extends V4DeCodeBase {
    public static void main(String[ ] args) {
        String t = getResourceAsString("v4.jsp") ;
        EsfTemplate esf = new EsfTemplate(t) ;
        System.out.println(esf.execute( )) ;
    }
}
```

In the example above, the following features may be noted. Template source flexibly (variable, property file, text file, database, etc. . . . ) and leverage of existing types (such as, e.g., Java™'s Java™.util.Date). Furthermore, the JSP template is executed directly in a Java™ main and provides an output. For example if the task is to obtain a user's email, a certain function may be utilized to get it and directly put the users name and email into the template.

Figure 5:
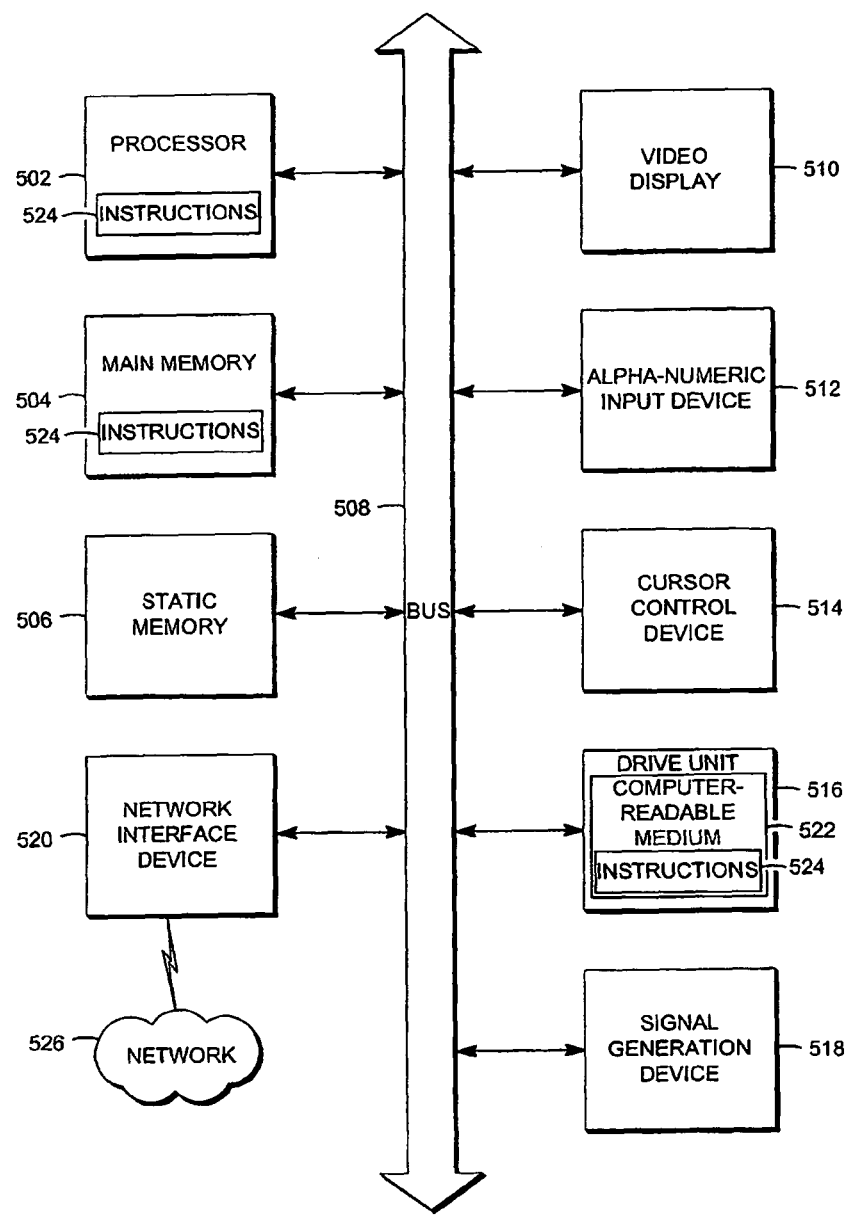
FIG. 5 illustrates a diagrammatic representation of an example machine in the form of a computer system within which a set of instructions, for causing the machine to perform any one or more of the methodologies discussed herein, may be executed.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A container-less Java Server Pages (JSP) system, the system comprising:
    a detector module, implemented using at least one processor, to detect a Java API call initiated by a client application to invoke a JSP template;
    a trigger module, implemented using at least one processor, to trigger the Java API; and
    an invoker, implemented using at least one processor, to cause an execute method of the Java API to be performed, the execute method to: translate the JSP template into Java, compile the Java into a Java class, execute the Java class to generate output, and return the generated output, wherein the container-less JSP system does not utilize servlet technology.

2. The system of claim 1, wherein the system comprises a resource resolver to resolve a logical identification of the JSP template being passed to a protocol-neutral Java interface into a physical location of the JSP template.

3. The system of claim 1, wherein the client application is a stand alone application.

4. The system of claim 1, wherein the client application is a batch application.

5. The system of claim 1, wherein the client application is a web application.

6. The system of claim 1, wherein a content source for the JSP template is a text file.

7. The system of claim 1, wherein a content source for the JSP template is a stream.

8. The system of claim 1, wherein a content source for the JSP template is a database.

9. A method, comprising:
   detecting a Java API call initiated by a client application to invoke a JSP template;
   triggering, using at least one processor coupled to a memory, the Java API; and
   invoking the JSP template, the invoking comprising causing an execute method of the Java API to be performed, the execute method comprising translating the JSP template into Java, compiling the translated Java into a class, and executing the class, wherein the method does not utilize servlet technology.

10. The method of claim 9, wherein invoking the JSP template comprises ascertaining a logical identification of the JSP template.

11. The method of claim 10, wherein invoking the JSP template comprises resolving the logical identification of the JSP template to access the JSP template.

12. The method of claim 9, wherein invoking the JSP template comprises ascertaining content associated with the JSP template.

13. The method of claim 9, wherein the client application is a stand alone application.

14. The method of claim 9, wherein the client application is an add-on proxy application in a J2EE container.

15. The method of claim 14, wherein the client application is an application component.

16. A machine-readable non-transitory storage medium having instructions stored thereon executable to cause a machine to perform operations comprising:
   detecting a Java API call initiated by a client application to invoke a JSP template;
   invoking the JSP template; and
   causing the Java API to perform, without utilizing servlet technology:
      translation of the JSP template into Java;
      compiling the translated Java into a class; and
      executing the class.

17. The machine-readable non-transitory storage medium of claim 16, wherein the Java API call is received by the machine from a remote computer system on which the client application is executing.

* * * * *